US011208528B2

(12) United States Patent
Konrad et al.

(10) Patent No.: US 11,208,528 B2
(45) Date of Patent: Dec. 28, 2021

(54) BIAXIALLY ORIENTED POLYESTER FILM FOR METAL LAMINATION

(71) Applicant: Mitsubishi Polyester Film GmbH, Weisbaden (DE)

(72) Inventors: Matthias Konrad, Kriftel (DE); Bodo Kuhmann, Runkel (DE); David Ehrhardt, Hochheim (DE); Thiemo Herbst, Mainz (DE); Holger Kliesch, Ginsheim-Gustavsburg (DE); Cynthia Bennett, Alzey (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 367 days.

(21) Appl. No.: 15/480,807

(22) Filed: Apr. 6, 2017

(65) Prior Publication Data
US 2017/0291987 A1 Oct. 12, 2017

(30) Foreign Application Priority Data

Apr. 8, 2016 (DE) .......................... 102016205913.0

(51) Int. Cl.
| | |
|---|---|
| *C08G 63/183* | (2006.01) |
| *B29C 48/08* | (2019.01) |
| *B29C 48/00* | (2019.01) |
| *B29C 48/21* | (2019.01) |
| *B29C 48/88* | (2019.01) |
| *B32B 27/36* | (2006.01) |
| *B29C 55/12* | (2006.01) |
| *B32B 15/09* | (2006.01) |
| *B32B 15/20* | (2006.01) |
| *B32B 27/08* | (2006.01) |
| *B32B 15/08* | (2006.01) |
| *B29K 267/00* | (2006.01) |

(Continued)

(52) U.S. Cl.
CPC ........ *C08G 63/183* (2013.01); *B29C 48/0018* (2019.02); *B29C 48/022* (2019.02); *B29C 48/08* (2019.02); *B29C 48/21* (2019.02); *B29C 48/914* (2019.02); *B29C 55/12* (2013.01); *B32B 15/09* (2013.01); *B32B 15/20* (2013.01); *B32B 27/08* (2013.01); *B32B 27/36* (2013.01); *B29K 2067/00* (2013.01); *B29K 2267/00* (2013.01); *B29K 2267/003* (2013.01); *B29K 2267/006* (2013.01); *B29K 2995/0039* (2013.01); *B29K 2995/0041* (2013.01); *B29L 2007/008* (2013.01); *B29L 2031/565* (2013.01); *B32B 7/04* (2013.01); *B32B 7/12* (2013.01); *B32B 15/04* (2013.01); *B32B 15/08* (2013.01); *B32B 27/18* (2013.01); *B32B 27/20* (2013.01); *B32B 37/12* (2013.01); *B32B 37/15* (2013.01); *B32B 37/153* (2013.01); *B32B 2250/244* (2013.01); *B32B 2255/10* (2013.01); *B32B 2255/20* (2013.01); *B32B 2255/24* (2013.01); *B32B 2264/10* (2013.01); *B32B 2264/102* (2013.01); *B32B 2307/514* (2013.01); *B32B 2307/518* (2013.01); *B32B 2307/702* (2013.01); *B32B 2307/704* (2013.01); *B32B 2307/706* (2013.01); *B32B 2307/714* (2013.01); *B32B 2307/752* (2013.01); *B32B 2311/24* (2013.01); *B32B 2367/00* (2013.01); *B32B 2435/00* (2013.01); *B32B 2439/00* (2013.01); *B32B 2439/66* (2013.01); *B32B 2439/70* (2013.01); *B65D 43/00* (2013.01); *C08G 63/16* (2013.01); *C08G 63/85* (2013.01); *C08K 3/013* (2018.01); *C08L 67/02* (2013.01); *C08L 67/03* (2013.01); *C08L 2203/16* (2013.01); *C09D 7/63* (2018.01); *C09D 201/10* (2013.01); *Y10T 428/31681* (2015.04); *Y10T 428/31786* (2015.04)

(58) Field of Classification Search
None
See application file for complete search history.

(56) References Cited

U.S. PATENT DOCUMENTS 4,206,299 A * 6/1980 Yamazaki ............... B32B 15/08
528/288
4,362,775 A * 12/1982 Yabe ....................... B32B 15/08
428/213

(Continued)

FOREIGN PATENT DOCUMENTS

| | | | |
|---|---|---|---|
| EP | 22502 A * | 1/1981 | |
| EP | 312304 B1 | 3/1993 | |

(Continued)

OTHER PUBLICATIONS

W. Shotyk et al. "Contamination of Bottled Waters with Antimony Leaching from Polyethylene Terephthalate (PET) Increases upon Storage," Environmental Science & Technology, 2007, 41 (5), pp. 1560-1563.

*Primary Examiner* — Vivian Chen
(74) *Attorney, Agent, or Firm* — ProPat, LLC; Vinisha Joshi

(57) ABSTRACT

The invention relates to a multilayer biaxially oriented polyester film comprising a base layer B, an amorphous outer layer A and a further outer layer C, where this polyester film is suitable for lamination with metal sheets. The invention in particular relates to a polyester film which comprises (based on the mass of polyester) from 2 to 15% by weight of isophthalate-derived units in the base layer and which comprises more than 19% by weight of isophthalate-derived units in the amorphous layer A, and which has a silane-based coating on the outer layer A. The invention further relates to a process for the production of these films.

23 Claims, No Drawings

(51) Int. Cl.
  *C08G 63/85* (2006.01)
  *B65D 43/00* (2006.01)
  *C08G 63/16* (2006.01)
  *C08L 67/03* (2006.01)
  *C09D 7/63* (2018.01)
  *C08L 67/02* (2006.01)
  *C09D 201/10* (2006.01)
  *C08K 3/013* (2018.01)
  *B32B 37/15* (2006.01)
  *B32B 37/12* (2006.01)
  *B32B 27/20* (2006.01)
  *B32B 27/18* (2006.01)
  *B32B 15/04* (2006.01)
  *B32B 7/04* (2019.01)
  *B32B 7/12* (2006.01)
  *B29K 67/00* (2006.01)
  *B29L 7/00* (2006.01)
  *B29L 31/56* (2006.01)

(56) References Cited

U.S. PATENT DOCUMENTS

| | | | | |
|---|---|---|---|---|
| 4,369,222 A * | 1/1983 | Hedrick | B32B 15/08 | 156/307.1 |
| 4,375,494 A * | 3/1983 | Stokes | B32B 27/08 | 428/323 |
| 4,503,189 A * | 3/1985 | Igarashi | C09J 175/06 | 525/104 |
| 4,874,647 A * | 10/1989 | Yatsu | B32B 27/36 | 428/35.7 |
| 4,898,786 A * | 2/1990 | Swofford | B32B 27/34 | 428/480 |
| 5,082,738 A * | 1/1992 | Swofford | B32B 17/10018 | 428/423.7 |
| 5,093,208 A * | 3/1992 | Heyes | B32B 15/08 | 428/623 |
| 5,149,389 A * | 9/1992 | Heyes | B32B 15/08 | 156/272.4 |
| 5,300,335 A * | 4/1994 | Miyazawa | B32B 15/08 | 428/35.8 |
| 5,384,354 A * | 1/1995 | Hasegawa | B29C 55/12 | 524/539 |
| 5,582,319 A * | 12/1996 | Heyes | B32B 15/08 | 220/62.22 |
| 5,591,518 A * | 1/1997 | Sumiya | C08J 5/18 | 428/318.4 |
| 5,618,621 A * | 4/1997 | Hasegawa | B32B 27/36 | 428/343 |
| 5,686,510 A * | 11/1997 | Asai | B32B 15/08 | 523/220 |
| 5,714,273 A * | 2/1998 | Wake | B65D 25/14 | 220/62.22 |
| 5,753,377 A * | 5/1998 | Takahashi | B32B 15/08 | 428/480 |
| 5,759,651 A * | 6/1998 | Machii | B65D 1/28 | 220/62.22 |
| 5,780,158 A * | 7/1998 | Asai | B32B 15/08 | 428/412 |
| 6,025,056 A * | 2/2000 | Machii | B32B 15/08 | 428/204 |
| 6,071,599 A * | 6/2000 | Kosuge | B32B 15/08 | 428/213 |
| 6,127,473 A * | 10/2000 | Yoshida | B29D 7/01 | 524/493 |
| 6,270,888 B1 * | 8/2001 | Rutter | B32B 27/18 | 428/212 |
| 6,331,344 B1 * | 12/2001 | Okazaki | G11B 5/73927 | 428/141 |
| 6,358,604 B1 * | 3/2002 | Peiffer | B32B 27/36 | 428/336 |
| 6,423,401 B2 * | 7/2002 | Peiffer | B29C 55/143 | 264/173.1 |
| 6,607,808 B2 * | 8/2003 | Peiffer | B32B 27/36 | 264/288.4 |
| 6,607,815 B2 * | 8/2003 | Bartsch | B29C 55/023 | 264/288.4 |
| 6,855,758 B2 * | 2/2005 | Murschall | B32B 27/18 | 428/349 |
| 2002/0160215 A1 * | 10/2002 | Peiffer | B29C 55/16 | 428/480 |
| 2003/0069387 A1 * | 4/2003 | Majima | B32B 15/08 | 528/271 |
| 2005/0153157 A1 * | 7/2005 | Matsubayashi | C22C 38/12 | 428/615 |
| 2006/0070551 A1 * | 4/2006 | Kanamori | C09D 183/04 | 106/287.17 |
| 2006/0073317 A1 * | 4/2006 | Sato | B32B 27/18 | 428/212 |
| 2007/0031688 A1 * | 2/2007 | Suzuki | B32B 15/08 | 428/458 |
| 2007/0134470 A1 * | 6/2007 | Jesberger | B32B 27/16 | 428/141 |
| 2008/0241448 A1 * | 10/2008 | Sato | B32B 15/08 | 428/35.8 |
| 2008/0261063 A1 * | 10/2008 | Yamanaka | B32B 1/02 | 428/483 |
| 2008/0318073 A1 * | 12/2008 | Klein | B29C 55/023 | 428/480 |
| 2010/0025283 A1 * | 2/2010 | Oshima | B21D 51/26 | 206/524.3 |
| 2010/0159795 A1 * | 6/2010 | Sarnstrom | B32B 7/02 | 446/220 |
| 2010/0247889 A1 * | 9/2010 | Kliesch | C09D 7/41 | 428/220 |
| 2010/0275815 A1 * | 11/2010 | Dave | C09D 5/1662 | 106/287.1 |
| 2011/0097574 A1 * | 4/2011 | Faldysta | C08J 7/043 | 428/336 |
| 2012/0018341 A1 * | 1/2012 | Kanazawa | C09D 167/02 | 206/524.3 |
| 2012/0128926 A1 * | 5/2012 | Ohishi | B32B 15/011 | 428/102 |
| 2013/0142973 A1 * | 6/2013 | Kliesch | C08L 67/03 | 428/35.3 |
| 2013/0344264 A1 * | 12/2013 | Chicarella | B32B 15/09 | 428/34.7 |
| 2014/0004286 A1 * | 1/2014 | Sakellarides | B32B 27/08 | 428/36.6 |
| 2014/0162051 A1 * | 6/2014 | Jesberger | B32B 27/08 | 428/327 |
| 2016/0257796 A1 * | 9/2016 | Qu | C08G 18/4825 | |
| 2017/0151746 A1 * | 6/2017 | Klein | B29C 47/0004 | |
| 2017/0152075 A1 * | 6/2017 | Moritz | B32B 7/12 | |
| 2017/0152356 A1 * | 6/2017 | Moritz | C08L 67/02 | |
| 2018/0050518 A1 * | 2/2018 | Nakaya | B32B 15/09 | |
| 2018/0170010 A1 * | 6/2018 | Yoshimura | B32B 27/36 | |
| 2018/0361715 A1 * | 12/2018 | Sato | B32B 27/08 | |

FOREIGN PATENT DOCUMENTS

| | | |
|---|---|---|
| EP | 586 161 A1 | 3/1994 |
| EP | 474 240 B1 | 12/1995 |
| EP | 1 647 398 A1 | 4/2006 |
| EP | 2 045 075 A2 | 4/2009 |
| EP | 2810776 A1 | 12/2014 |
| EP | 3 178 651 A1 | 6/2017 |
| GB | 1 465 973 A | 3/1977 |
| JP | 56-057867 A * | 5/1981 |
| JP | 08-099387 A * | 4/1996 |
| JP | 10-183095 A * | 7/1998 |
| JP | 2001-171041 A * | 6/2001 |
| JP | 2001-262114 A * | 9/2001 |
| JP | 2002-003813 A * | 1/2002 |
| JP | 2003-171644 A * | 6/2003 |
| KR | 2003-0011723 A * | 2/2003 |

(56) References Cited

FOREIGN PATENT DOCUMENTS

| | | | |
|---|---|---|---|
| WO | WO 00/46026 A | * | 8/2000 |
| WO | WO 01/53080 A1 | | 7/2001 |
| WO | WO 2001/053080 A | * | 7/2001 |

* cited by examiner

BIAXIALLY ORIENTED POLYESTER FILM FOR METAL LAMINATION

CROSS-REFERENCE TO RELATED APPLICATIONS

This application claims priority to German Patent Application 102016205913.0 filed Apr. 8, 2016, which is hereby incorporated herein by reference in its entirety.

FIELD OF THE INVENTION

The invention relates to a multilayer biaxially oriented polyester film comprising a base layer B, an amorphous outer layer A and a further outer layer C, where this polyester film is suitable for lamination with metal sheets. The invention in particular relates to polyester films which have been preferably produced from antimony-free polyesters and comprise free-radical scavengers. One embodiment of the invention relates to a polyester film which comprises (based on the mass of polyester) from 2 to 15% by weight of isophthalate-derived units in the base layer and which comprises more than 19% by weight of isophthalate-derived units in the amorphous layer A, and which has a silane-based coating on the outer layer A. The invention further relates to a process for the production of these films.

BACKGROUND OF THE INVENTION

Polyester films have many different application sectors, because they have excellent optical and mechanical properties. One application sector is metal-sheet lamination, where the polyester film is laminated to a metal sheet.

The lamination is intended to protect the metal sheets from corrosion and/or for decorative purposes (printing). In the case of cans which are produced from film-laminated metal sheets, the film applied by lamination on the internal side serves as barrier between contents and metal: the film firstly prevents diffusion of corrosive constituents of the contents to the metal and secondly prevents diffusion of corrosion products into the contents. A film applied by lamination to the external side generally serves not only for prevention of corrosion but also for decorative purposes.

Metal-sheet-film laminates are usually produced by, for example, bringing a multilayer, sealable film into contact with a metal sheet heated to a high temperature. Another possibility consists in use of an adhesive for adhesive bonding of the film to the metal sheet. Either solvent-based adhesives or hotmelts are used here.

The films of the present invention are particularly suitable for lamination at high temperature to aluminium. By virtue of the melting point, lower than that of an (unmodified) PET film, the film of the invention can be melted in the laminate with aluminium without any adverse effect on the mechanical properties of the aluminium. Melting of the film allows deformation of the laminate without cracking in the film.

GB-A-1 465 973 describes a thick coextruded, two-layer polyester film of which one layer is comprised of isophthalic-acid-containing and terephthalic-acid-containing copolyesters and the other layer of which is comprised of polyethylene terephthalate. The specification says nothing about the adhesion of the film to metal. Lack of pigmentation prevents winding of, and further processing of, the film.

EP-B-312304 describes a process for lamination of a multilayer polyester film to metal. For this, the metal sheet is preheated, the film is applied by lamination, and the material is then melted and quenched. Process temperatures mentioned for achieving good deformability of the metal-sheet laminate are at least 260° C. The polyester film is comprised of an interior non-crystalline layer with melting point below 250° C. and of an exterior crystalline layer with melting point above 220° C. The polyester of the non-crystalline layer is typically a copolyester made of 80% of ethylene terephthalate and 20% of ethylene isophthalate. The thickness of corresponding films in the Examples is 15 µm.

EP-B-474 240 describes polyester films for metal-sheet lamination which are comprised of a copolyester with melting point from 210 to 245° C. The Examples mention copolyesters with from 9 to 12 mol % isophthalic acid content. The laminated metal sheets are processed to give deep-drawn cans for packaging in the food-and-drink industry. The films mentioned are monofilms with no sealing layer and exhibit insufficient adhesion to aluminium.

EP-A-586161 describes single-layer polyester films for lamination to metal sheet which comprise a copolyester with melting point from 210 to 245° C. and particles of two different sizes with average diameter from 0.05 to 0.6 m and from 0.3 to 2.5 am. The laminated metal sheets are processed to give deep-drawn cans for packaging in the food-and-drink industry. The films are intended to have good heat resistance and not to alter the taste of the contents.

The films according to the prior art are disadvantageous because they exhibit insufficient adhesion at the melting point that is appropriate for aluminium. The insufficient adhesion is in particular noticeable in contact with food or drink or substitutes therefor and in the case of pasteurization or sterilization in contact with the said contents. They moreover have insufficient deformability and corrosion resistance.

SUMMARY OF ADVANTAGEOUS EMBODIMENTS OF THE INVENTION

It was an object of the present invention to find a polyester film which is suitable for lamination to aluminium. The film is intended to exhibit good adhesion in the laminate and to be highly effective in preventing corrosion of the aluminium. The laminate is moreover intended to be suitable for direct contact with food or drink and to retain mechanical stability even on prolonged exposure to heat, while exhibiting low antimony migration values.

The object is achieved according to the invention via provision of a coextruded, multilayer, biaxially oriented polyester film with a crystalline base layer B, an amorphous outer layer A and a crystalline outer layer C. The amorphous outer layer A preferably bears a silane-containing coating.

DETAILED DESCRIPTION OF ADVANTAGEOUS EMBODIMENTS OF THE INVENTION

The polyester film according to the invention is comprised of polyester, additives, and preferably a coating.

Base Material

The base layer of the film according to the invention is crystalline, and its melting point is below 250° C., preferably below 245° C. The crystallinity gives the film good mechanical strength, and permits cost-effective production and efficient processing of the film.

In one possible embodiment, the polyester of the base layer B of the film is comprised of at least 85% by weight, preferably at least 90% by weight, particularly preferably at least 92% by weight, of ethylene-terephthalate-derived units and of from 2 to 15 t by weight, preferably from 3 to 10% by weight, particularly preferably from 4 to 8% by weight, of ethylene-isophthalate-derived units (based in each case on the total mass of polyester). The entirety of ethylene-terephthalate-derived units and ethylene-isophthalate-derived units is at least 95% by weight of the polyester.

The remaining units derived from carboxylic acids and, respectively, alcohols derive from aliphatic or cycloaliphatic diols and, respectively, dicarboxylic acids other than terephthalic acid and isophthalic acid.

Examples of suitable other aliphatic diols are diethylene glycol, triethylene glycol, aliphatic glycols of the general formula HO—($CH_2$)n-OH, where n is an integer from 3 to 6 (in particular propane-1,3-diol, butane-1,4-diol, pentane-1,5-diol and hexane-1,6-diol) and branched aliphatic glycols having up to 6 carbon atoms. Among the cycloaliphatic diols preference is given to cyclohexanediols (in particular cyclohexane-1,4-diol).

Examples of other cycloaliphatic dicarboxylic acids are cyclohexanedicarboxylic acids, in particular cyclohexane-1, 4-dicarboxylic acid. Among the aliphatic dicarboxylic acids, the (C3 to C19)-alkane diacids are particularly suitable, where the alkane moiety can be straight-chain or branched.

If polyester with content lower than 2% by weight of ethylene-isophthalate-derived units is used, the melting point of the film is too high. If polyester with content higher than 15% by weight of ethylene-isophthalate-derived units is used, the aroma-barrier properties and migration properties (water-vapour barrier, gas barrier) of the film are impaired. The mechanical properties of the film are moreover impaired, and this is noticeable in impaired processability of the film (an example being greater susceptibility to tearing).

The base layer can optionally be comprised of a mixture of polyethylene terephthalate and polybutylene terephthalate. The mixture comprises from 70 to 85% by weight of ethylene-terephthalate-derived units and from 15 to 30% by weight of butylene-terephthalate-derived units. The remaining monomer units derive from other aliphatic, cycloaliphatic or aromatic diols and, respectively, dicarboxylic acids of the types described above. The entirety of ethylene-terephthalate-derived units and butylene-terephthalate-derived units amounts to at least 95% by weight of the polyester. This mixture has the disadvantage that the two polyesters undergo transesterification in the extruder, and that the degree of transesterification is difficult to control.

The polyester can by way of example be produced by the transesterification process. This starts from dicarboxylic diesters and diols, which are reacted with use of the conventional transesterification catalysts, for example zinc salts, calcium salts, lithium salts, magnesium salts and manganese salts. The intermediate products are then polycondensed in the presence of well-known polycondensation catalysts, for example titanium salts. The production process used can equally be the direct esterification process in the presence of polycondensation catalysts. This process starts directly from the dicarboxylic acids and the diols. Polyesters according to the invention are obtainable commercially.

Antimony compounds continue to be the traditional catalysts for the production of polyesters. Some antimony compounds can be hazardous to health—in particular at higher concentrations and when exposure is frequent. In the EU there is therefore a restriction on the maximal permissible migration of antimony from a film into food or drink. Antimony migration is increased at high temperatures and in the case of amorphous polyesters of the types present after melting of the film on a metal sheet, and reduction of antimony content is therefore desirable. Antimony from polyethylene terephthalate (PET) is under discussion as potentially hazardous in the technical literature (an example being W. Shotyk and M. Krachler in Environ. Sci. Technol., 2007, 41 (5), pp. 1560-1563).

The reason for continued use of antimony compounds as polycondensation catalysts in polyester films is likely to be that antimony-free films have substantially lower heat resistance than antimony-containing films, and cannot therefore be used for high temperatures.

When polyester film is laminated to metal, temperatures arise that are higher than the melting point of the film. In the case of titanium-catalysed polyesters, considerable molecular-weight degradation occurs under these conditions. A consequence of this is that microcracking occurs during the processing of the laminated metal sheet and can lead to corrosion of the metal. The oven test described in the present description correlates with molecular weight degradation and therefore serves as simple method to test the suitability of the film for metal lamination. Thermal degradation of titanium-catalyzed polyesters can, as described below, be countered by adding stabilizers.

Amorphous Outer Layer A:

The amorphous outer layer A applied by coextrusion to the base layer B is comprised of at least 19% by weight, preferably at least 23% by weight, particularly preferably at least 27% by weight, of ethylene-isophthalate-derived units and of up to 81% by weight, preferably 77% by weight, particularly preferably 73% by weight, of ethylene-terephthalate-derived units (based in each case on the total mass of polyester in the outer layer A). The remaining monomer units derive from other aliphatic, cycloaliphatic or aromatic diols and, respectively, dicarboxylic acids of the types that can also occur in the base layer.

Crystalline Outer Layer C:

Polymers that can be used for the other, crystalline outer layer C can in principle be the same as those described above for the crystalline base layer B.

In order to improve winding behaviour and processability, the outer layer C has inert particles as filler. The concentration of the inert particles in the outer layer C is at least 0.05% by weight, preferably at least 0.10% by weight and particularly preferably at least 0.15% by weight. The concentration of the inert particles in the said layer should be lower than or equal to 0.5% by weight, based on the total mass of the layer, because otherwise the film becomes more difficult to produce. The concentration in essence depends on the desired optical properties of the film.

In one preferred embodiment, the entire film comprises polyesters which have been produced with use of titanium-based catalysts, and with use of from 50 to 10000 ppm of a free-radical scavenger, content preferably being from 100 to 5000 ppm and in particular from 150 to 1200 ppm. Contents lower than 50 ppm tend to lead to failure in the oven test, and contents higher than 10000 ppm have no further improving effect on the film and therefore merely reduce cost-effectiveness, and can lead to migration of the stabilizer from the film into packaged food or drink. Contents above 1200 ppm moreover tend to lead to formation of gels with high stabilizer content and a yellow tinge.

The proportion of free-radical scavenger in the outer layer C of the film is at least 300 ppm, preferably at least 500 ppm and ideally at least 800 ppm. Below 300 ppm the oven test is not passed.

EP-A-2810776 describes suitable free-radical scavengers. The compounds with the CAS numbers 1709-70-2, 3135-18-0, 6683-19-8 and 57569-40-1 exhibit particularly good properties in respect of heat resistance, little migration from the film, and yellowing. These are the preferred free-radical scavengers for the purpose of the invention, and the formulas associated with the foregoing CAS numbers are hereby incorporated by reference herein. The compounds with the CAS numbers 1709-70-2 and 6683-19-8 are particularly preferred here for the reasons mentioned.

Coating

The film is coated with a functional silane on the outer layer (A) in order to improve adhesion on aluminium. It is preferable that the functional group is a primary amine. The amino-functional silane is represented in the unhydrolyzed state by the general formula

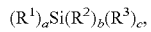

$(R^1)_a Si(R^2)_b (R^3)_c,$ in which $R^1$ is a non-hydrolyzable functional group having at least one primary amino group, $R^2$ is a hydrolysable group, for example a lower alkoxy group, an acetoxy group or a halide, and $R^2$ is an unreactive, non-hydrolyzable group, for example a lower alkyl group or a phenyl group; where a is greater than or equal to 1; b is greater than or equal to 1; c is greater than or equal to zero and a+b+c=4. Lower alkyl or alkoxy groups are those having from 1 to 4 carbon atoms, and halides are fluoro, chloro, bromo or iodo.

Examples of aminosilanes complying with this formula are N-2-(aminoethyl)-3-aminopropyltrimethoxysilane, 3-aminopropyltrimethoxysilane, 4-aminobutyltriethoxysilane, 4-aminobutyldimethylmeylmethoxysilane and p-aminophenyltrimethoxysilane. Preferred silane is N-2-(aminoethyl)-3-aminopropyltrimethoxysilane (CAS 1760-24-3).

The general procedure is hydrolysis of the aminosilane in water and application thereof to one side of the polyester film by a conventional process.

The coating solution is produced via mixing of the aminosilane with water at from about 0.2 to about 6% by weight content. The hydrolysis can optionally be facilitated by adding a weak acid, e.g. acetic acid, in order to achieve a pH below 6. At least one of the hydrolysable groups of the silane is hydrolysed here to give a silanol group (SiOH). The hydrolysis product of the aminosilane is believed to have a partially hydrolysed, cyclic structure, probably with ionic bonds arising between the amino group and the silicon moiety of the molecule. The term hydrolysed here can therefore also relate to partially hydrolysed structures of these types. In order to achieve a good result, the coating solution should be used no later than 6 hours after hydrolysis of the aminosilane.

The effect of application of the coating to the amorphous outer layer A is that the film is no longer heat-sealable. Surprisingly, adhesion to aluminium is nevertheless improved.

The polyester film can be transparent, white or opaque, glossy or matt. These different optical properties are achieved by way of example via addition of different quantities of additives such as barium sulphate, calcium carbonate, amorphous silica or titanium dioxide. These additives can be present not only in the base layer but also in the outer layer C.

It is preferable that the film comprises, in the base layer, a small quantity (less than 2% by weight) of titanium dioxide. This gives the film a milky white appearance, and the blushing that occurs during sterilization thus becomes less visible.

The inert particles in the outer layer C that are used to process the film are preferably particles of amorphous silica with d50 value 1-6 μm.

In the film the thickness of the amorphous outer layer A is in the range of from 0.5 to 5 μm, preferably from 0.6 to 3 μm, more preferably from 0.7 to 2 μm. If the outer layer A is thinner than 0.5 μm, metal adhesion is inadequate; if the said thickness is more than 5 μm, the film is too soft.

The total thickness of the polyester film according to the invention can vary within certain limits. It is from 5 to 20 μm, preferably from 6 to 15 μm, particularly preferably from 7 to 12 μm, where the proportion of the layer B is preferably from 30 to 90% of the total thickness. If the thickness of the film is less than 5 μm, corrosion of the metal sheet is not prevented. If the thickness of the film is more than 20 μm, there is a resultant disadvantageous effect on the cost-effectiveness of the laminated metal sheet.

After the oven test, the tensile strain at break of the film according to the invention in every film direction is more than 5%, preferably more than 10% and ideally more than 25%. Tensile strain at break before the oven test is more than 60%.

In particular when a sufficient quantity of the abovementioned free-radical scavengers are added, and moreover when the particularly preferred stabilizers are used, the increase of the yellowness value b* of the film according to the invention after the oven test is less than 5, preferably less than 3 and ideally less than 1.

The longitudinal and transverse shrinkage of the film according to the invention at 150° C. is usually less than 10%, preferably less than 5%, and particularly preferably less than 2%. Reduction of film width during lamination is thus minimized.

In one particularly preferred embodiment the amorphous outer layer A is comprised of 27% by weight of ethylene-isophthalate-derived units and 72.96% by weight of ethylene-terephthalate-derived units and 0.04% by weight of particles made of amorphous silica with median particle size (d50) 2.5 μm. The said outer layer A moreover has a coating which derives from N-2-(aminoethyl)-3-aminopropyltrimethoxysilane and the thickness of which is 1.5 nm.

The base layer B is comprised of 4% by weight of ethylene-isophthalate-derived units, 95.5 t by weight of ethylene-terephthalate-derived units and 0.5% by weight of titanium dioxide.

The outer layer C is comprised of 4% by weight of ethylene-isophthalate-derived units, 95.85% by weight of ethylene-terephthalate-derived units and 0.1.5% by weight of particles made of amorphous silica with median particle size (d50) 2.5 μm.

All of the layers comprise a free-radical scavenger at a concentration of 500 ppm; (because the quantity of the free-radical scavenger is small, this is excluded from the 100% by weight of the respective layers).

Production Process

The production process for polyester films is described by way of example in "Handbook of Thermoplastic Polyesters, Ed. S. Fakirov, Wiley-VCH, 2002" or in the chapter "Polyesters, Films" in "Encyclopedia of Polymer Science and Engineering, Vol. 12, John Wiley & Sons, 1988". The preferred process for the production of the film comprises the following steps. The raw materials are melted in an extruder for each layer and are extruded through a three-layer flat-film die onto a chilled take-off roll. The said film is then reheated and is oriented in at least one direction—either in machine direction (MD) or in transverse direction (TD), but preferably in longitudinal and transverse direction or in transverse and longitudinal direction. Film temperatures in the stretching process are generally from 10 to 60° C. above the glass transition temperature Tg of the polyester used; the stretching ratio for the longitudinal stretching is usually from 2.5 to 5.0, in particular from 3.0 to 4.5, the stretching ratio for the transverse stretching being from 3.0 to 5.0, in particular from 3.5 to 4.5. The longitudinal stretching can also be carried out at the same time as the transverse stretching (simultaneous stretching) or in any conceivable sequence. The film is then heat-set at oven temperatures of from 180 to 235° C., in particular from 210 to 230° C. The film is then cooled and wound.

Advantages of the Invention

The film according to the invention features excellent adhesion to metal, in particular to aluminium. The film moreover exhibits good heat resistance, i.e. little molecular weight degradation at high temperatures of the type that occur during melting after lamination to metal sheet. In particular, the polyester-aluminium laminate is suitable for the production of caps for drinks cans. The composition of the film ensures that the laminate has good deformability and that the cap provides clean opening.

Even when process temperatures are relatively low, when the film is laminated or melted it exhibits good adhesion to aluminium, with no resultant impairment of the mechanical stability of the aluminium.

It has been ensured that a quantity of up to 60% by weight, based on the total weight of the film, of the chopped material (regrind) can be reintroduced into the extrusion process during production of the film, with no resultant significant adverse effect on the physical properties of the film.

Properties

The following parameters and test methods were used to characterize the raw materials and the films:

Glass Transition Temperature and Melting Point

The glass transition temperature and melting point of the polyester of the outer layer A were determined (DIN 53765) by using DSC equipment (Perkin-Elmer Pyris 1). The sample was heated at 20 K/min up to 300° C. and held at this temperature for 10 min. The sample was then cooled as quickly as possible (500 K/min) to 20° C. The sample was held at 20° C. for 10 min and heated at 20 K/min up to 300° C. The values from the second heating procedure were used in order to achieve better reproducibility.

Mechanical Properties

The modulus of elasticity, ultimate tensile strength, tensile strain at break and F5 value are measured longitudinally and transversely in accordance with ISO 527-1 and 527-3 with the aid of a tensile strain meter (010 type from Zwick/Germany).

Standard Viscosity (SV)

Standard viscosity SV is determined—by a method based on DIN 53726—via measurement on a 1% by weight solution in dichloroacetic acid (DCA) in an Ubbelohde viscosimeter at 25° C. The dimensionless SV value is determined as follows from the relative viscosity ($\eta_{rel}$):

$$SV=(\eta_{rel}-1)\times 1000$$

For this, film or polymer raw materials were dissolved in DCA. Particle content was determined by ashing, and correction was carried out by increasing input weight accordingly.

Shrinkage

Thermal shrinkage is determined on square film samples with edge length 10 cm. The samples are cut out in such a way that one edge runs parallel to machine direction and one edge runs perpendicularly to machine direction. The samples are measured precisely (the edge length L0 being determined for each direction TD and MD as L0 TD and L0 MD), and heated at the stated shrinkage temperature (in this case 150° C.) in a convection drying oven for 15 min. The samples are removed and measured precisely at room temperature (edge length LTD and LMD). Shrinkage is obtained from the following equation:

Shrinkage [%]$MD=100*(L0\ MD-LMD)/L0\ MD$

Shrinkage [%]$TD=100*(L0\ TD-LTD)/L0\ TD$

Oven Test

A piece of film is placed in a convection oven which had been preheated to 1.80° C. The film here is placed on a wire mesh (mesh width from 0.25 to 2 cm). The film remains in the oven for 90 minutes at 180° C. Mechanical properties, shrinkage, colour properties and SV are then determined as described.

Adhesion on Aluminium

Aluminium sheet pretreated with Cr(III) is heated to 200° C., and the film is laminated under pressure to this metal sheet. The laminate is then heated to 250° C. for 10 s. This material is then heated to 100° C. for 30 min in contact with 3% acetic acid. A cross-cut test in accordance with DIN EN ISO 2409 is then carried out on the film side. The result is evaluated with grades from 0 (very good) to 5 (very poor).

Measurement of Crystallinity

The crystallinity of the respective film side is determined from the ratio of the intensities of the bands at 1040 cm$^{-1}$ and 1337 cm$^{-1}$ in the ATR spectrum (ATR=attenuated total reflection), the intensities being standardized on the basis of the band at 1117 cm$^{-3}$. The band at 1040 cm$^{-1}$ is attributable to amorphous polyester; the band at 1337 cm$^{-1}$ is attributable to crystalline polyester (Polymer Letters Edition, Vol. 1.2 (1974), pp. 13-19).

$$\text{For amorphous layers: } \frac{I_{1040cm^{-1}}}{I_{1337cm^{-1}}} > 2.2$$

$$\text{For crystalline layers: } \frac{I_{1040cm^{-1}}}{I_{1337cm^{-1}}} < 1.5$$

The measurement is made with an IFS28 IR spectrometer from Bruker (Karlsruhe, Germany) with use of a diamond ATR crystal.

The ATR spectrum can be recorded directly on the coated film. It is assumed that up to a thickness of 0.1 m the coating has no effect on the spectrum of the outer layer. If this is doubted, the coating can be removed before the ATR spectrum is recorded.

Colour Value

The colour properties L*, a*, b* are measured with COLOR-SPHERE® equipment from Byk-Gardner (US) in transmission for the individual layers and the layer packages in accordance with the standard DIN 1674 or ASTM D2244. The geometry used is d/8 with gloss, measurement range is from 400 to 700 nm, spectral resolution is 20 nm, the illuminant used is D65, the observer used is 100, and the diameter of the aperture plate is 30 mm.

Examples are used below for further explanation of the invention.

EXAMPLES

The following starting materials were used for the production of the film described below:

PET1=Polyester made of ethylene glycol and terephthalic acid and isophthalic acid, the proportion of isophthalic acid in the polymer being 4.5% by weight, with SV value 812 and 1.2% by weight DEG content (diethylene glycol content as monomer). Produced by PTA process. Catalyst potassium titanyl oxalate with 18 ppm of titanium. Transesterification catalyst zinc acetate.

PET2=Polyester made of ethylene glycol and terephthalic acid and isophthalic acid, the proportion of isophthalic acid in the polymer being 23% by weight, with SV value 820 and 1.4% by weight DEG content (diethylene glycol content as monomer) and 5000 ppm content of IRGANOX® 1010, CAS No. 6683-19-8 (producer BASF Schweiz). The IRGANOX® 1010 was added at the start of the polycondensation. Produced by PTA process. Catalyst potassium titanyl oxalate with 18 ppm of titanium. Transesterification catalyst zinc acetate.

PET3=Polyester made of ethylene glycol and terephthalic acid and isophthalic acid, the proportion of isophthalic acid in the polymer being 33% by weight, with SV value 810 and 1.4% by weight DEG content (diethylene glycol content as monomer). Produced by PTA process. Catalyst potassium titanyl oxalate with 18 ppm of titanium. Transesterification catalyst zinc acetate.

PET4=Polyethylene terephthalate made of ethylene glycol and terephthalic acid with SV value 825, 0.9% by weight DEG content (diethylene glycol content as monomer) and 5000 ppm content of IRGANOX® 1010, CAS No. 6683-19-8 (producer BASF Schweiz). The Irganox 1010 was added at the start of the polycondensation. Produced by PTA process. Catalyst potassium titanyl oxalate with 18 ppm of titanium. Transesterification catalyst zinc acetate.

PET5=Polyethylene terephthalate made of ethylene glycol and dimethyl terephthalate with SV value 820 and 0.9% by weight DEG content (diethylene glycol content as monomer) and 1.5% by weight of SYLOBLOC® 46 silicon dioxide pigment with d50 2.5 µm. Produced by PTA process. Catalyst potassium titanyl oxalate with 18 ppm of titanium. Transesterification catalyst zinc acetate.

PET6=10 000 ppm of IRGANOX® 1010, CAS No. 6683-19-8 (producer: BASF Schweiz) incorporated into PET1 by means of a twin-screw extruder. SV value 695.

PET7=Polyethylene terephthalate made of ethylene glycol and dimethyl terephthalate with 0.9% by weight DEG content (diethylene glycol content as monomer) produced by PTA process. Catalyst potassium titanyl oxalate with 18 ppm of titanium. Transesterification catalyst zinc acetate. Solid-phase-condensed to SV value 1100.

PET8=60% by weight of titanium dioxide pigment with d50 0.2 µm incorporated into PET7 by means of a twin-screw extruder. SV value 510.

Inventive Example 1

Outer Layer (A):
35% by weight of PET3
60% by weight of PET2
5% by weight of PET5
Base Layer (B):
90% by weight of PET1
10% by weight of PET4
Outer Layer (C), a Mixture of:
80% by weight of PET1
10% by weight of PET4
10% by weight of PET5
Coating on Outer Layer (A):
2.0% by weight of 3-aminopropyltrimethoxysilane in water 3-Aminopropyltrimethoxysilane was slowly added, with stirring, to deionized water and stirred for 30 min before use.

The abovementioned raw materials were melted in an extruder for each layer and were extruded through a three-layer flat-film die onto a chilled take-off roll. The resultant amorphous prefilm was then firstly stretched longitudinally. The longitudinally stretched film was corona-treated in corona-discharge equipment and then coated with the solution described above by reverse-gravure-roll coating. The film was then dried at a temperature of 100° C. and then stretched transversely, set and wound (final film thickness 12.0 µm, outer layers each 1.1 µm). The conditions in the individual steps of the process were:

| Longitudinal stretching: | Temperature | 80-115° C. |
| | Longitudinal stretching ratio: | 4.0 |
| Transverse stretching: | Temperature: | 80-135° C. |
| | Transverse stretching ratio: | 4.1 |
| Setting: | | 2 s at 225° C. |

The thickness of the dry coating is 12 nm.
Table 1 shows the properties of the resultant film.

Inventive Example 2

The procedure was as described in Inventive Example 1. The raw material composition was now as follows:
Outer Layer (A):
50% by weight of PET3
45% by weight of PET2
5% by weight of PET5
Base Layer (B):
96% by weight of PET1
4% by weight of PET6
Outer Layer (C), a Mixture of:
86% by weight of PET1
10% by weight of PET4
4% by weight of PET5
Coating on Outer Layer (A):
2.5% by weight of N-2-(aminoethyl)-3-aminopropyltrimethoxysilane in water
N-2-(Aminoethyl)-3-aminopropyltrimethoxysilane was slowly added, with stirring, to deionized water and stirred for 30 min before use.

The total thickness of the film is 9.0 µm, and the thicknesses of the outer layers A and C are both 1.0 µm.
The thickness of the dry coating is 15 nm.

Inventive Example 3

The procedure was as described in Inventive Example 1. The raw material composition was now as follows:
Outer Layer (A):
50% by weight of PET3
45% by weight of PET2
5% by weight of PET5
Base Layer (B):
50% by weight of PET1
50% by weight of regrind
Outer Layer (C), a Mixture of:
80% by weight of PET1
10% by weight of PET4
10% by weight of PET5
Coating on Outer Layer (A):
2.5% by weight of N-2-(aminoethyl)-3-aminopropyltrimethoxysilane in water N-2-(Aminoethyl)-3-aminopropyltrimethoxysilane was slowly added, with stirring, to deionized water and stirred for 30 min before use.

The total thickness of the film is 9.0 μm, and the thicknesses of the outer layers A and C are both 1.0 μm.

The thickness of the dry coating is 15 rm.

Comparative Example 1

A 20 μm film was produced as described in EP-B-312304. The raw material composition was as follows:

Outer layer A: Copolyester with 20% by weight of ethylene isophthalate and 80% by weight of ethylene terephthalate (84% of PET2+16% of PET1)

Base layer B: 98% by weight of polyethylene terephthalate with SV value 815 (as PET7 but not solid-phase-condensed) and 2% by weight antiblock masterbatch with Silica (PET5).

The film was produced as described in Inventive Example 1, but not coated.

Adhesion of this film on aluminium is insufficient. If this film is used for a laminate with aluminium, the high temperature that has to be selected for melting of the film reduces the mechanical strength of the aluminium. This laminate cannot therefore be deep-drawn and is unsuitable for can production.

TABLE 1

Properties of the films of the Examples

| | Inventive Example 1 | Inventive Example 2 | Inventive Example 3 | Comparative Example 1 |
|---|---|---|---|---|
| Melting point in ° C. | 246 | 244 | 243 | 254 |
| Adhesion on aluminium, cross-cut test | 0 | 0 | 0 | 3 |
| Crystallinity of outer layer A | 3.3 | 3.5 | 3.5 | 3.4 |
| Crystallinity of outer layer C | 1.1 | 1.1 | 1.1 | 0.9 |
| Δ b* after oven test | 0.3 | 0.4 | 0.6 | 0.5 |
| SV after oven test | 730 | 725 | 710 | 720 |
| Tensile strain at break MD in % | 91 | 93 | 89 | 95 |
| Tensile strain at break TD in % | 99 | 101 | 97 | 106 |
| Tensile strain at break MD in % after oven test | 90 | 91 | 90 | 94 |
| Tensile strain at break TD in % after oven test | 99 | 96 | 96 | 103 |

That which is claimed:

1. A multilayer, biaxially oriented polyester film for metal sheet lamination, comprising a base layer B, an outer layer A and an outer layer C, wherein the outer layer A is amorphous, the base layer B and the outer layer C are crystalline, and where the crystalline base layer B comprises, based on the mass of polyester in the layer, at least 85% by weight of ethylene-terephthalate-derived units and from 2 to 15% by weight of ethylene-isophthalate-derived units and where the amorphous outer layer A comprises, based on the mass of polyester in the layer, more than 19% by weight of ethylene-isophthalate-derived units and no cycloaliphatic diol, and wherein, said outer layer A has an adhesion-promoting silane-based coating that is adhered to a metal sheet.

2. Polyester film according to claim 1, wherein the polyester of the base layer B is comprised of at least 90% by weight of ethylene-terephthalate-derived units, based on the total mass of polyester.

3. Polyester film according to claim 1, wherein the polyester of the base layer B is comprised of from 3 to 10% by weight of ethylene-isophthalate-derived units.

4. Polyester film according to claim 1, wherein the polyester of the base layer B is comprised of from 4 to 8% by weight of ethylene-isophthalate-derived units.

5. Polyester film according to claim 1, wherein (i) the film comprises ethylene-terephthalate units and (ii) the ethylene-terephthalate-derived units and ethylene-isophthalate-derived units together amount to at least 95% by weight of the polyester based on the mass of polyester in layer B.

6. Polyester film according to claim 1, wherein the amorphous outer layer A is comprised of at least 19% by weight of ethylene-isophthalate-derived units and of up to 81% by weight of ethylene-terephthalate-derived units, based in each case on the total mass of polyester in the outer.

7. Polyester film according to claim 1, wherein the outer layer C comprises at least 0.05% by weight of inert particles.

8. Polyester film according to claim 1, wherein the polyesters of the film were produced via titanium-based catalysts.

9. Polyester film according to claim 1, wherein the film comprises from 50 to 10000 ppm of a free-radical scavenger and the outer layer C comprises at least 300 ppm of free-radical scavenger.

10. Polyester film according to claim 9, wherein the free-radical scavenger is selected from one or more of the compounds with the CAS numbers 1709-70-2, 3135-18-0, 6683-19-8 and 57569-40-1.

11. Polyester film according to claim 1, wherein said silane-based coating of the outer layer (A) is formed of amino-functional silane.

12. Polyester film according to claim 11, wherein the amino-functional silane in an unhydrolyzed state is a compound of the formula

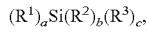

$(R^1)_a Si(R^2)_b (R^3)_c,$ in which
R$^1$ is a non-hydrolysable functional group having at least one primary amino group,
R$^2$ is a hydrolysable group, wherein the hydrolysable group is selected from the group consisting of a lower alkoxy group, an acetoxy group or a halide, and
R$^3$ is an unreactive, non-hydrolysable group, wherein the non-hydrolysable group is selected from the group consisting of a lower alkyl group or a phenyl group;
a is greater than or equal to 1;
b is greater than or equal to 1;
c is greater than or equal to zero and
a+b+c=4 and
lower alkyl or alkoxy groups are those having from 1 to 4 carbon atoms and halides are fluoro, chloro, bromo or iodo.

13. Polyester film according to claim 1, wherein said film has a thickness of from 5 to 20 μm.

14. Process for the production of a polyester film according to claim 1, comprising compressing and liquefying the polyester mixtures of the layers A, B and C in a plurality of extruders to form melts, shaping the melts in a coextrusion die to give a flat melt film, drawing the flat melt film off on a chill roll and on one or more take-off rolls to form a prefilm, cooling, solidifying and then biaxially orienting the prefilm, optionally coating the outer layer side A, wherein the base layer B and the outer layer C are crystalline and the base layer B comprises, based on the mass of polyester, from 2 to 15% by weight of isophthalate-derived units and the amorphous outer layer A comprises, based on the mass of polyester, more than 19% by weight of isophthalate-derived units, and where the outer layer A has a silane-based coating.

15. Metal sheet laminate comprising a film according to claim 1.

16. Metal sheet laminate according to claim 15, wherein said metal sheet laminate is a cap for a drink can.

17. Metal sheet laminate according to claim 15, wherein the metal sheet is an aluminium sheet.

18. The polyester film according to claim 1, wherein the silane-based coating consists of amino-functional silane.

19. The polyester film according to claim 1, wherein the outer layer A and the outer layer C both comprise polyethylene terephthalate made of ethylene glycol and dimethyl terephthalate.

20. A multilayer, biaxially oriented polyester film for metal sheet lamination comprising a base layer B, an outer layer A and an outer layer C,
   wherein the outer layer A is amorphous, the base layer B and the outer layer C are crystalline, and
   wherein said layer A and layer C are placed on opposite sides of layer B, and
   wherein, the crystalline base layer B comprises, based on the mass of polyester in the layer, from 2 to 15% by weight of ethylene-isophthalate-derived units and at least 85% by weight of ethylene-terephthalate-derived units, and
   wherein, the amorphous outer layer A comprises, based on the mass of polyester in the layer, more than 27% by weight of ethylene-isophthalate-derived units and up to 73% by weight of ethylene-terephthalate-derived units
   wherein, said outer layer A has a coating consisting of functional silane rendering the film no longer heat sealable, and
   wherein, said coating is adhered to a metal sheet.

21. Polyester film according to claim 20, wherein the ethylene-terephthalate-derived units and ethylene-isophthalate-derived units together amount to at least 95% by weight of the polyester in said film; and
   wherein said functional silane is selected from the group consisting of N-2-(aminoethyl)-3-aminopropyltrimethoxysilane, 3-aminopropyltrimethoxysilane, 4-aminobutyltriethoxysilane, 4-aminobutyldimethylmethoxysilane or p-aminophenyltrimethoxysilane.

22. A multilayer, biaxially oriented polyester film for metal sheet lamination comprising a base layer B, an outer layer A and an outer layer C, wherein the outer layer A is amorphous, the base layer B and the outer layer C are crystalline, and where the crystalline base layer B comprises 70 to 85% by weight of ethylene-terephthalate-derived units, based on the mass of polyester in the layer, from 15 to 30% by weight of butylene-terephthalate-derived units and the amorphous outer layer A comprises, based on the mass of polyester in the layer, more than 19% by weight of ethylene-isophthalate-derived units, and
   wherein, said outer layer A has a silane-based coating consisting of functional silane, and
   wherein, said coating is adhered to a metal sheet.

23. The polyester film according to claim 22, wherein the ethylene-terephthalate-derived units and butylene-terephthalate-derived units amount to at least 95% by weight based on the mass of the polyester in layer B.

* * * * *